(12) United States Patent
Sugimura

(10) Patent No.: US 9,195,326 B2
(45) Date of Patent: Nov. 24, 2015

(54) INPUT APPARATUS

(71) Applicant: Yoshihiko Sugimura, Nagoya (JP)

(72) Inventor: Yoshihiko Sugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 73 days.

(21) Appl. No.: 14/063,122

(22) Filed: Oct. 25, 2013

(65) Prior Publication Data

US 2014/0313170 A1    Oct. 23, 2014

(30) Foreign Application Priority Data

Apr. 18, 2013    (JP) .................................. 2013-087620

(51) Int. Cl.
| | |
|---|---|
| *G06F 3/0354* | (2013.01) |
| *G06F 3/041* | (2006.01) |
| *G06K 9/22* | (2006.01) |
| *G06F 17/24* | (2006.01) |

(52) U.S. Cl.
CPC ............ *G06F 3/03545* (2013.01); *G06F 3/041* (2013.01); *G06K 9/222* (2013.01); *G06F 17/243* (2013.01)

(58) Field of Classification Search
CPC . G06F 3/04883; G06F 3/03545; G06F 3/041; G06F 17/243; G06F 17/242; G06K 9/222; G06K 9/00402; G06K 9/0154
See application file for complete search history.

(56) References Cited

U.S. PATENT DOCUMENTS

| | | | |
|---|---|---|---|
| 6,052,481 A | 4/2000 | Grajski et al. | |
| 6,088,481 A * | 7/2000 | Okamoto et al. | 382/189 |
| 6,144,764 A | 11/2000 | Yamakawa et al. | |
| 6,456,740 B1 * | 9/2002 | Carini et al. | 382/187 |
| 2002/0067854 A1 * | 6/2002 | Reintjes et al. | 382/199 |
| 2002/0107885 A1 * | 8/2002 | Brooks et al. | 707/505 |
| 2002/0163511 A1 | 11/2002 | Sekendur | |
| 2003/0106985 A1 | 6/2003 | Fagin et al. | |

(Continued)

FOREIGN PATENT DOCUMENTS

| | | | |
|---|---|---|---|
| JP | 62-179075 A | 8/1987 | |
| JP | 63-115266 A | 5/1988 | |

(Continued)

OTHER PUBLICATIONS

Co Pending U.S. Appl. No. 14/062,944, filed Oct. 25, 2013.

(Continued)

*Primary Examiner* — Sanjiv D Patel
(74) *Attorney, Agent, or Firm* — Banner & Witcoff, Ltd.

(57) ABSTRACT

An input apparatus includes a detection portion, a processor, and a memory. The detection portion is configured to detect a position. The memory is configured to store computer-readable instructions. The computer-readable instructions cause the processor to perform processes that include acquiring a plurality of first positions, determining whether a combination and a sequence of the plurality of first positions satisfy a specified first condition, acquiring a plurality of second positions after it has been determined that the combination and the sequence satisfy the first condition, determining whether a combination and a sequence of the plurality of second positions satisfy any of a plurality of second conditions, and identifying, in a case where it has been determined that the combination and the sequence of the plurality of second positions satisfy one of the plurality of second conditions, format information associated with the one of the plurality of second conditions.

8 Claims, 11 Drawing Sheets

(56) References Cited

U.S. PATENT DOCUMENTS

| | | | |
|---|---|---|---|
| 2004/0064787 A1* | 4/2004 | Braun et al. | 715/505 |
| 2008/0065396 A1 | 3/2008 | Marshall | |
| 2008/0181501 A1 | 7/2008 | Faraboschi et al. | |
| 2008/0260241 A1* | 10/2008 | Ye et al. | 382/159 |

FOREIGN PATENT DOCUMENTS

| | | |
|---|---|---|
| JP | 01-118955 A | 5/1989 |
| JP | 04-048375 A | 2/1992 |
| JP | 11-203409 A | 7/1999 |
| JP | 2000-315241 A | 11/2000 |
| JP | 2002-132792 A | 5/2002 |
| JP | 2003-323441 A | 11/2003 |
| JP | 2009-098836 A | 5/2009 |
| JP | 2010-205138 A | 9/2010 |

OTHER PUBLICATIONS

Co Pending U.S. Appl. No. 14/062,964, filed Oct. 25, 2013.
Co Pending U.S. Appl. No. 14/063,089, filed Oct. 25, 2013.
Feb. 5, 2015—(US) Notice of Allowance—U.S. Appl. No. 14/062,964.
Apr. 17, 2015—(US) Non-Final Office Action—U.S. Appl. No. 14/063,089.

* cited by examiner

FIG. 7

| CHECK BOX | | FORM | AREA INFORMATION | | | | FORMAT INFORMATION |
|---|---|---|---|---|---|---|---|
| | | | n=1 (A) | n=2 (B) | n=3 (C) | n=4 (D) | |
| | | | BOTTOM RIGHT | TOP LEFT | BOTTOM LEFT | TOP RIGHT | |
| 1ST | | ALL | | | | | — |
| 2ND | | 120 | 1441 | 1442 | 1443 | 1444 | TITLE, TAG, ... |
| | AREA | 130 | 1441 | 1446 | 1443 | 1448 | TITLE, START TIME, FINISH TIME, LOCATION, ... |
| | | ‥ | ‥ | ‥ | ‥ | ‥ | |

231

INPUT APPARATUS

CROSS-REFERENCE TO RELATED APPLICATION

This application claims priority to Japanese Patent Application No. 2013-087620 filed Apr. 18, 2013, the content of which is hereby incorporated herein by reference.

BACKGROUND

The present disclosure relates to an input apparatus in which a trajectory of motion of a writing instrument can be digitized as line drawing information, on the basis of an operation of writing on a paper medium.

Known input apparatuses include an input apparatus in which, upon writing on a paper medium that is placed on a base, a trajectory of motion of a writing instrument can be digitized in the form of information of line drawings that are written on the paper medium. Technologies have been proposed that enable the apparatus to recognize the format of the paper medium that is placed on the base. For instance, the format of the paper medium may be recognized in the below-described manner. A plurality of calibration marks are printed at corners of a paper medium. The paper medium may be placed on a base. Firstly, the user may select, using an input pen, the plurality of calibration marks according to a sequence corresponding to the format of the paper medium. The apparatus can detect selected positions in the sequence. The apparatus can recognize the format of the paper medium that has been placed on the base, by identifying the detected positions and the format corresponding to the sequence.

SUMMARY

Writing may be implemented on calibration marks by the writing instrument, during ordinary writing on the paper medium by the user. The apparatus may recognize the format of the paper medium that is placed on the base if the sequence of writing on the calibration marks satisfies a specified condition. Accordingly, a format that is different from the format of the paper medium that is actually placed on the base may be erroneously recognized by the apparatus during ordinary writing.

Embodiments of the broad principles derived herein provide an input apparatus that allows identifying accurately the format of a paper medium that is placed on a base.

Embodiments provide an input apparatus that includes a detection portion, a processor, and a memory. The detection portion is configured to detect a position at which a paper medium disposed in a specified area is written upon by a writing portion. The memory is configured to store computer-readable instructions. The computer-readable instructions cause the processor to perform a process that includes acquiring a plurality of first positions. The plurality of first positions are a plurality of positions detected by the detection portion. The computer-readable instructions further cause the processor to perform a process that includes determining whether a combination and a sequence of the plurality of first positions that have been acquired satisfy a specified first condition. The computer-readable instructions further cause the processor to perform a process that includes acquiring a plurality of second positions. The plurality of second positions are a plurality of positions detected by the detection portion after it has been determined that the combination and the sequence of the plurality of first positions satisfy the first condition. The computer-readable instructions further cause the processor to perform a process that includes determining, with reference to a first storage portion, whether a combination and a sequence of the plurality of second positions that have been acquired satisfy any of a plurality of second conditions that are stored in the first storage portion. The first storage portion is configured to store each of the plurality of second conditions and format information in association with each other. Each of the plurality of second conditions indicates a combination and a sequence of a plurality of positions. The format information identifies a format of the paper medium. The computer-readable instructions further cause the processor to perform a process that includes identifying, in a case where it has been determined that the combination and the sequence of the plurality of second positions satisfy one of the plurality of second conditions, format information associated with the one of the plurality of second conditions

BRIEF DESCRIPTION OF THE DRAWINGS

Embodiments will be described below in detail with reference to the accompanying drawings in which:

FIG. 7 is a diagram illustrating a table;

DETAILED DESCRIPTION

Figure 1:
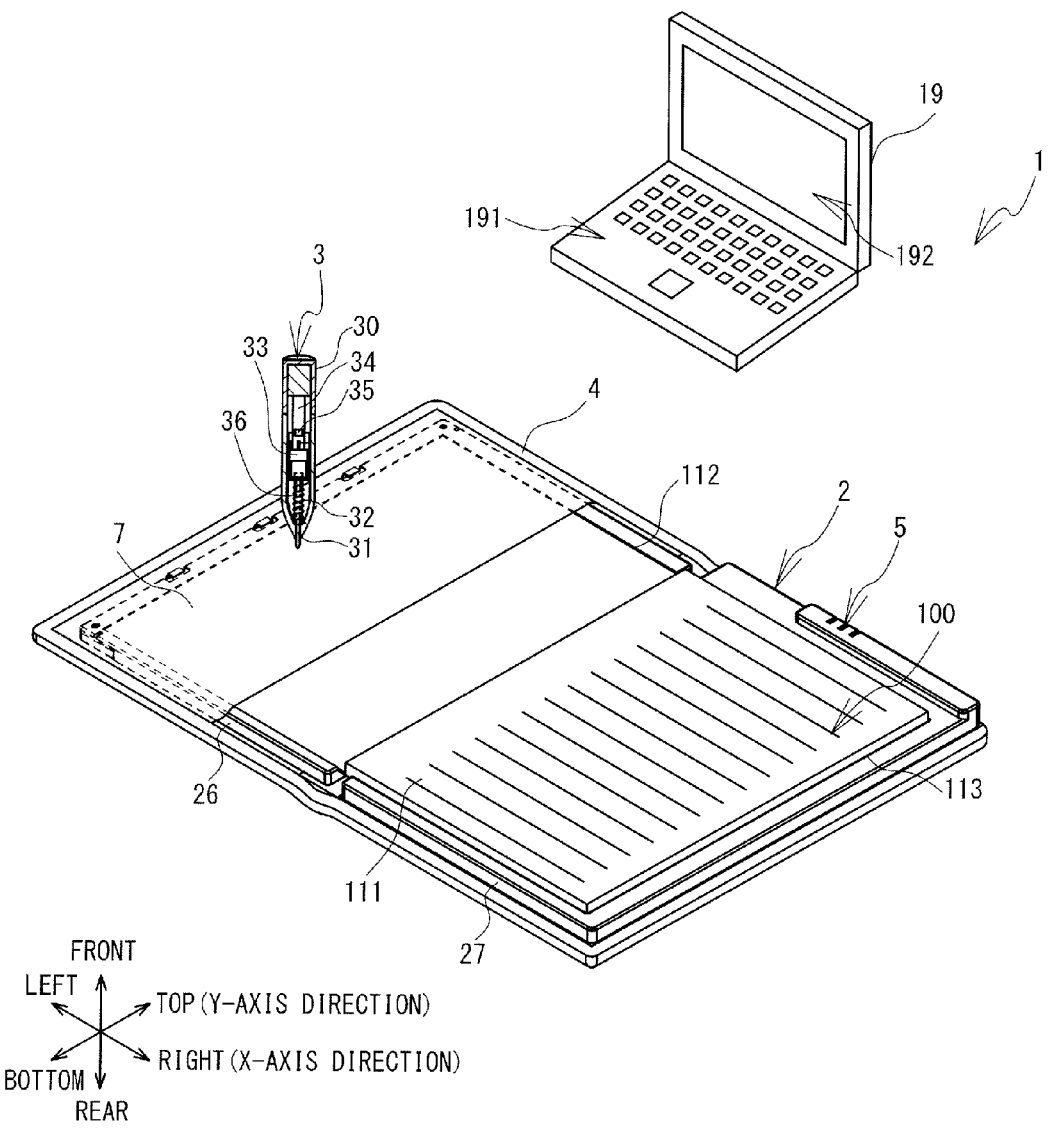
FIG. 1 is a diagram illustrating an overview of a handwriting input system.

Embodiments will be explained with reference to accompanying drawings. An overview of a handwriting input system 1 according to the present embodiment will be explained with reference to FIGS. 1 and 2. In the explanation below, the top left, bottom right, top, bottom, top right, and bottom left sides in FIG. 1 are respectively defined as the left, right, front, rear, top, and bottom of a reading device 2. In the explanation, the left-right direction and the top-bottom direction of the reading device 2 are respectively defined as an X-axis direction and a Y-axis direction.

As illustrated in FIG. 1, a handwriting input system 1 mainly includes a reading device 2, an electronic pen 3, and a personal computer (PC) 19. The reading device 2 is a portable, foldable, thin, and lightweight handwriting input apparatus. In the handwriting input system 1, a user may write a line drawing on a form 111 of a paper medium 100 that is fixed to the reading device 2, using an electronic pen 3. As used herein, the term line drawing encompasses, for instance, characters, numerals, symbols, and graphics. The reading device 2 detects the position of the electronic pen 3. The reading device 2 can identify the trajectory of the electronic pen 3 on the basis of a plurality of positions of the electronic pen 3 that have been detected over time. On the basis of data on the trajectory of the electronic pen 3 as identified by the reading device 2, the PC 19 can create and store an image file resulting from digitizing the line drawing that has been written on the form 111. Data on the trajectory of the electronic pen 3 as identified by the reading device 2 is referred to hereafter as stroke data.

Figure 2:
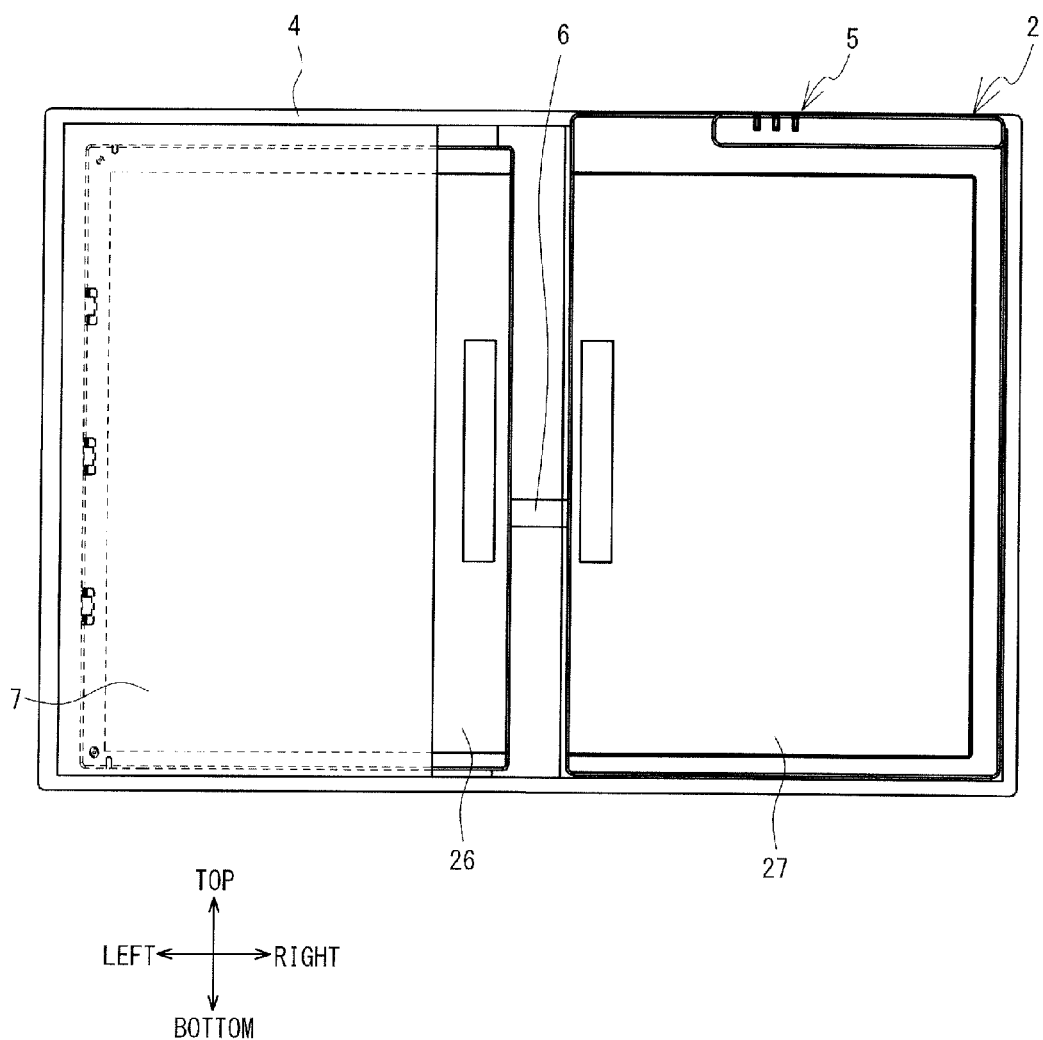
FIG. 2 is a plan-view diagram of a reading device.

As shown in FIG. 2, the reading device 2 mainly includes a pair of a left reading device 26 and a right reading device 27, as well as a flat cable 6 and a cover 4. The left reading device 26 and the right reading device 27 are rectangular thin plates and are disposed on the front face of the cover 4 in such a manner that the reading devices 26, 27 can be spread out in the left-right direction. The left reading device 26 and the right reading device 27 are electrically connected via the flat cable 6. The right reading device 27 includes three light-emitting diodes (LEDs) 5 at the top edge. The LEDs 5 allow notifying the user about the state of the reading device 2. The cover 4 includes a bag-like bag 7 on the left side. The left reading device 26 may be removably attached to the cover 4 by being inserted in the bag 7. The right reading device 27 may be affixed to the right front face of the cover 4 by way of, for instance, double-sided tape or an adhesive resin film.

The paper medium 100 may be removably attached to the front face of the reading device 2. As shown in FIG. 1, the paper medium 100 takes on a booklet shape that is spreadable in the left-right direction. In the paper medium 100, a pair of covers (a front cover 112 and a back cover 113) and a plurality of forms 111 are bound together at part of the respective edges of the pair of covers and the plurality of forms. As an example, the paper medium 100 may be an A5-size notebook. The format that indicates the layout of the design that is printed beforehand on the forms 111, and the like, is different for each type of paper medium 100. The format that indicates the layout of the design that is printed beforehand on the forms 111, and the like, is referred to hereafter as the format of the paper medium 100. Specific examples of forms 111 of a dissimilar format include, for instance, the below-described forms 120 (see FIG. 4) and forms 130 (see FIG. 5). The paper medium 100 may be attached to the reading device 2 in such a manner that the front cover 112 is placed on the top face of the left reading device 26, and the back cover 113 is placed on the top face of the right reading device 27. In the present embodiment, the paper medium 100 is attached, by way of, for instance, double-sided tape or an adhesive resin film, in a state where the paper medium 100 has been positioned on the reading device 2. That is, the left reading device 26 and the right reading device 27 may be moved integrally with the front cover 112 and the back cover 113, respectively. The user may write a line drawing on each form 111 of the paper medium 100 using the electronic pen 3.

A design that is used for enabling the format of the paper medium 100 to be recognized by the reading device 2 is printed beforehand on the back face 140 (see FIG. 6) of the front cover 112 of the paper medium 100. The reading device 2 can identify the format of the paper medium 100 on the basis of the operation of writing on the back face 140 using the electronic pen 3. The details involved are described further on.

The electronic pen 3 is a known electromagnetic induction-type electronic pen, and mainly includes a cylindrical body 30, a core body 31, a coil 32, a variable capacitor 33, a substrate 34, a capacitor 35, and an ink storage portion 36. The cylindrical body 30 has a cylindrical shape, and houses therein part of the core body 31, the coil 32, the variable capacitor 33, the substrate 34, the capacitor 35, and the ink storage portion 36. The core body 31 is provided at the leading end (bottom side in FIG. 1) of the electronic pen 3. The core body 31 is urged towards the leading end of the electronic pen 3 by an elastic member, which is not shown in the drawings. The leading end of the core body 31 protrudes out of the cylindrical body 30. The rear end side (top side in FIG. 1) of the core body 31 is connected to the ink storage portion 36, in which ink is stored. The ink storage portion 36 supplies ink to the core body 31. A line drawing may be formed by ink on the form 111 when the user writes on the form 111 using the electronic pen 3.

The coil 32 is held between the core body 31 and the variable capacitor 33 in a state where the coil 32 is wound around the ink storage portion 36. The variable capacitor 33 is fixed in the interior of the electronic pen 3 by the substrate 34. The capacitor 35 is mounted on the substrate 34. The capacitor 35 and the variable capacitor 33 are connected in parallel to the coil 32, and make up a known resonant (tuning) circuit.

The PC 19 is a general-purpose notebook personal computer. The PC 19 includes an input portion 191 and a display 192. The input portion 191 is used for inputting various instructions. The display 192 may display an image. A known information terminal (for instance, a tablet PC, a smart phone, or the like) may be used, instead of a personal computer, as the PC 19 in the handwriting input system 1.

Figure 3:
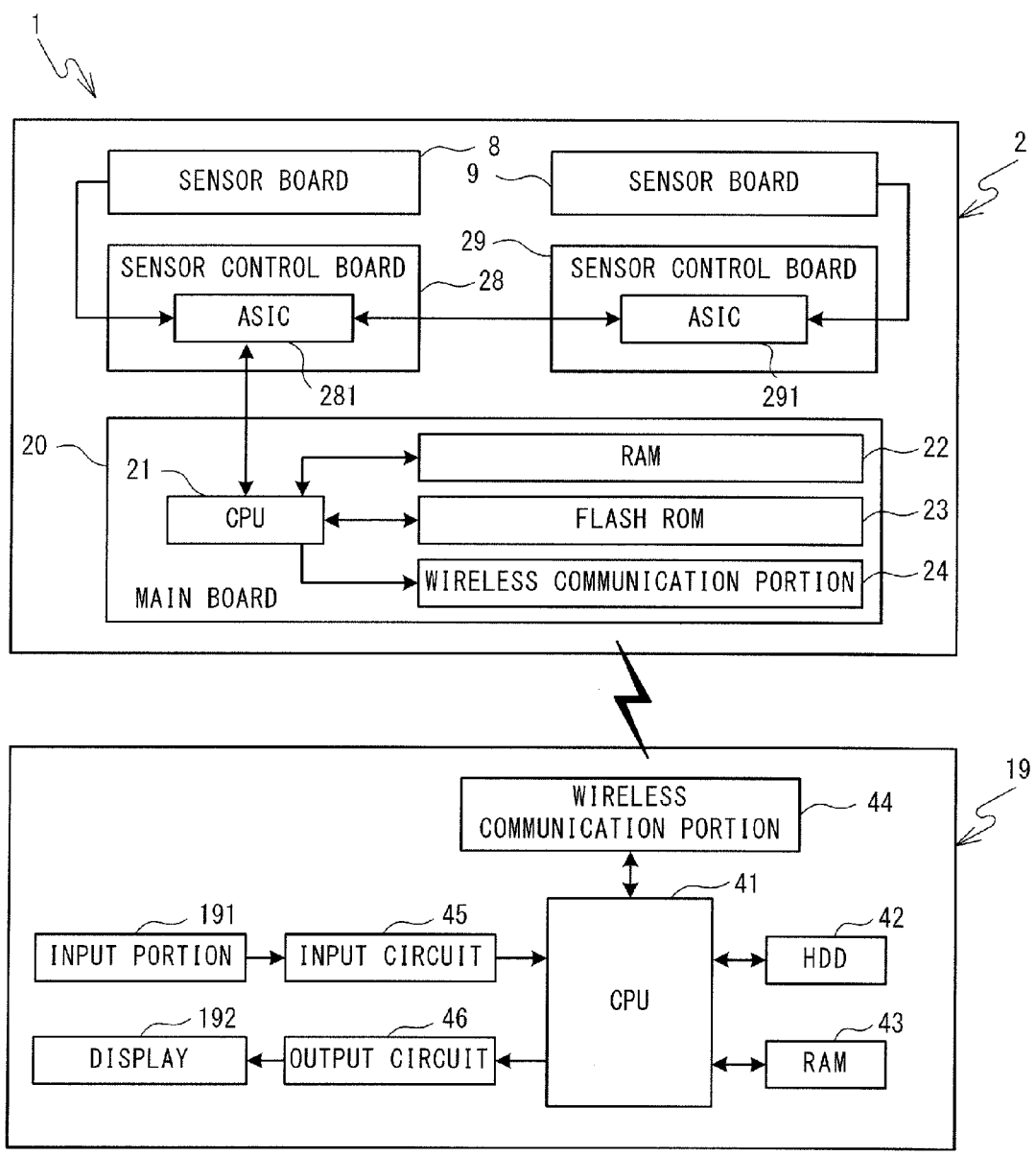
FIG. 3 is a block diagram illustrating an electrical configuration of the handwriting input system.

The electrical configuration of the handwriting input system 1 will be explained with reference to FIG. 3. The electrical configuration of the reading device 2 and an overview of the principle of acquisition of stroke data by the reading device 2 will be explained first. The reading device 2 includes sensor boards 8, 9, a main board 20, and sensor control boards 28, 29. The sensor boards 8, 9 are provided in the left reading device 26 and the right reading device 27, respectively.

The main board 20 includes a CPU 21, a RAM 22, a flash ROM 23, and a wireless communication portion 24. The RAM 22, the flash ROM 23, and the wireless communication portion 24 are electrically connected to the CPU 21. The CPU 21 controls the reading device 2. The RAM 22 stores temporarily various data such as computation data. The flash ROM 23 stores various programs that are executed by the CPU 21 in order to control the reading device 2. The flash ROM 23 also stores stroke data and a table 231 (see FIG. 7). The wireless communication portion 24 is a controller for executing close-range wireless communication with an external electronic device.

Multiple elongate loop coils are arrayed, in the X-axis direction and the Y-axis direction, in the sensor boards 8, 9. The sensor board 8 is electrically connected to an ASIC 281 of the sensor control board 28. When a writing operation by the electronic pen 3 is performed on the sensor board 8, the ASIC 281 executes processing of creating stroke data on the basis of the writing operation. The sensor board 9 is electrically connected to an ASIC 291 of the sensor control board 29. When a writing operation by the electronic pen 3 is performed on the sensor board 9, the ASIC 291 executes processing of creating stroke data on the basis of the writing operation. The master ASIC 281 is connected directly to the CPU 21, and the slave ASIC 291 is connected to the CPU 21 via the ASIC 281.

A brief explanation follows next on the principle of acquisition of stroke data when a writing operation by the electronic pen 3 is performed on the sensor boards 8, 9. The CPU 21 controls the ASICs 281, 291 to cause a current of a specific frequency (a transmission current for excitation) to flow in each one of loop coils of the sensor boards 8, 9. A magnetic field is generated as a result in each of the loop coils of the sensor boards 8, 9. In this state, the electronic pen 3 draws near to the sensor boards 8, 9 when, for instance, the user performs an operation of writing a line drawing, using the electronic pen 3, on the form 111 of the paper medium 100 that is fixed to the reading device 2. The resonant circuit in the electronic pen 3 resonates due to electromagnetic induction, and generates an induced magnetic field.

Next, the CPU 21 controls the ASICs 281, 291 to discontinue generation of the magnetic field by the respective loop coils of the sensor boards 8, 9. The respective loop coils of the sensor boards 8, 9 receive the induced magnetic field that is generated by the resonant circuit of the electronic pen 3. The CPU 21 controls the ASICs 281, 291 so as to detect a signal current (a reception current) that flows in the respective loop coils of the sensor boards 8, 9. The ASICs 281, 291 execute this operation one by one for all the loop coils. The position of the electronic pen 3 is detected, as a result, as coordinate information, on the basis of the reception current.

A writing pressure is applied to the core body 31 during the operation of writing a line drawing on the form 111 using the electronic pen 3. The inductance of the coil 32 varies in accordance with the writing pressure that is applied to the core body 31. As a result, the resonance frequency of the resonant circuit of the electronic pen 3 changes in accordance with the writing pressure that is applied to the core body 31. The CPU 21 identifies the writing pressure that is applied to the electronic pen 3 by detecting changes in the resonance frequency (phase changes). The CPU 21 can determine, on the basis of the identified writing pressure, whether a line drawing is being written on the form 111 of the paper medium 100. If the CPU 21 determines that a line drawing is being written on the form 111, the CPU 21 acquires stroke data indicating the trajectory of the electronic pen 3, and stores the stroke data in the flash ROM 23. The stroke data includes information on coordinates that indicate a plurality of positions along the trajectory.

An explanation follows next on the electrical configuration of the PC 19, and on an overview of the processing whereby the PC 19 acquires stroke data from the reading device 2. The PC 19 mainly includes a CPU 41, a hard drive (HDD) 42, a RAM 43, a wireless communication portion 44, an input circuit 45, an output circuit 46, an input portion 191, and a display 192. The CPU 41 controls the PC 19. The CPU 41 is electrically connected to the HDD 42, the RAM 43, the wireless communication portion 44, the input circuit 45, and the output circuit 46. The HDD 42 stores various programs that are executed by the CPU 41.

The PC 19 includes a medium reading device (for instance, a CD-ROM drive), not shown. A program that is stored in a storage medium (for instance, a CD-ROM) can thus be read by the medium reading device and be installed in the HDD 42 of the PC 19. A program may be received from an external device (not shown in the drawings) or through a network that is connected to the PC 19, and be installed in the HDD 42 of the PC 19.

The RAM 43 stores various temporary data. The wireless communication portion 44 is a controller for executing close-range wireless communication with an external electronic device. The input circuit 45 controls transmission of instructions from the input portion 191 (for instance, a mouse, a keyboard, a touch panel, or the like) to the CPU 41. The output circuit 46 controls the display of an image on the display 192 in accordance with instructions from the CPU 41.

When the user inputs an instruction of acquiring stroke data from the reading device 2, the CPU 41 executes close-range wireless communication with the reading device 2, by way of the wireless communication portion 44. The stroke data stored in the flash ROM 23 of the reading device 2 is transmitted by the reading device 2 to the PC 19. The CPU 41 stores, in the RAM 43, the stroke data transmitted by the reading device 2. Communication for transmission of stroke data from the reading device 2 to the PC 19 is not limited to wireless communication, and may involve wire communication.

To identify a character string based on the stroke data stored in the RAM 43, the CPU 41 executes optical character recognition (OCR) processing. As used herein, the term character string encompasses characters, numerals, symbols, graphics, and the like indicated by a character code that can be recognized by the PC 19. Identification involves herein not only instances where a plurality of characters, numerals, symbols, and graphics are identified, but also instances wherein a single character, numeral, symbol, or graphic is identified. The CPU 41 can create image data that indicates the trajectory indicated by the stroke data, and executes the OCR processing on the created image data, to identify thereby the character string. The method of identifying character strings may be modified. For instance, the CPU 41 may identify character strings directly from stroke data, by using a known pattern matching technique.

Figure 4:
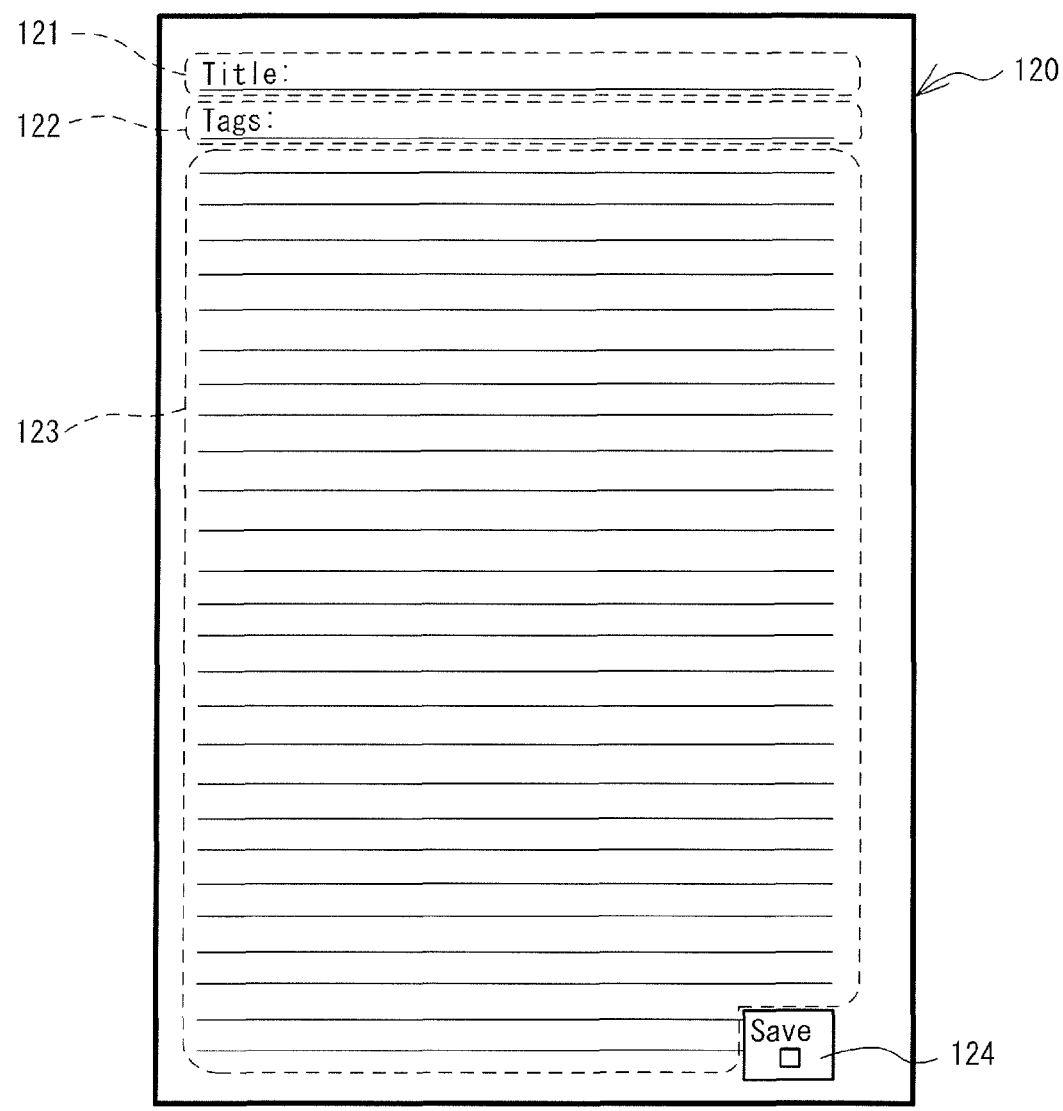
FIG. 4 is a diagram illustrating a form.
Figure 5:
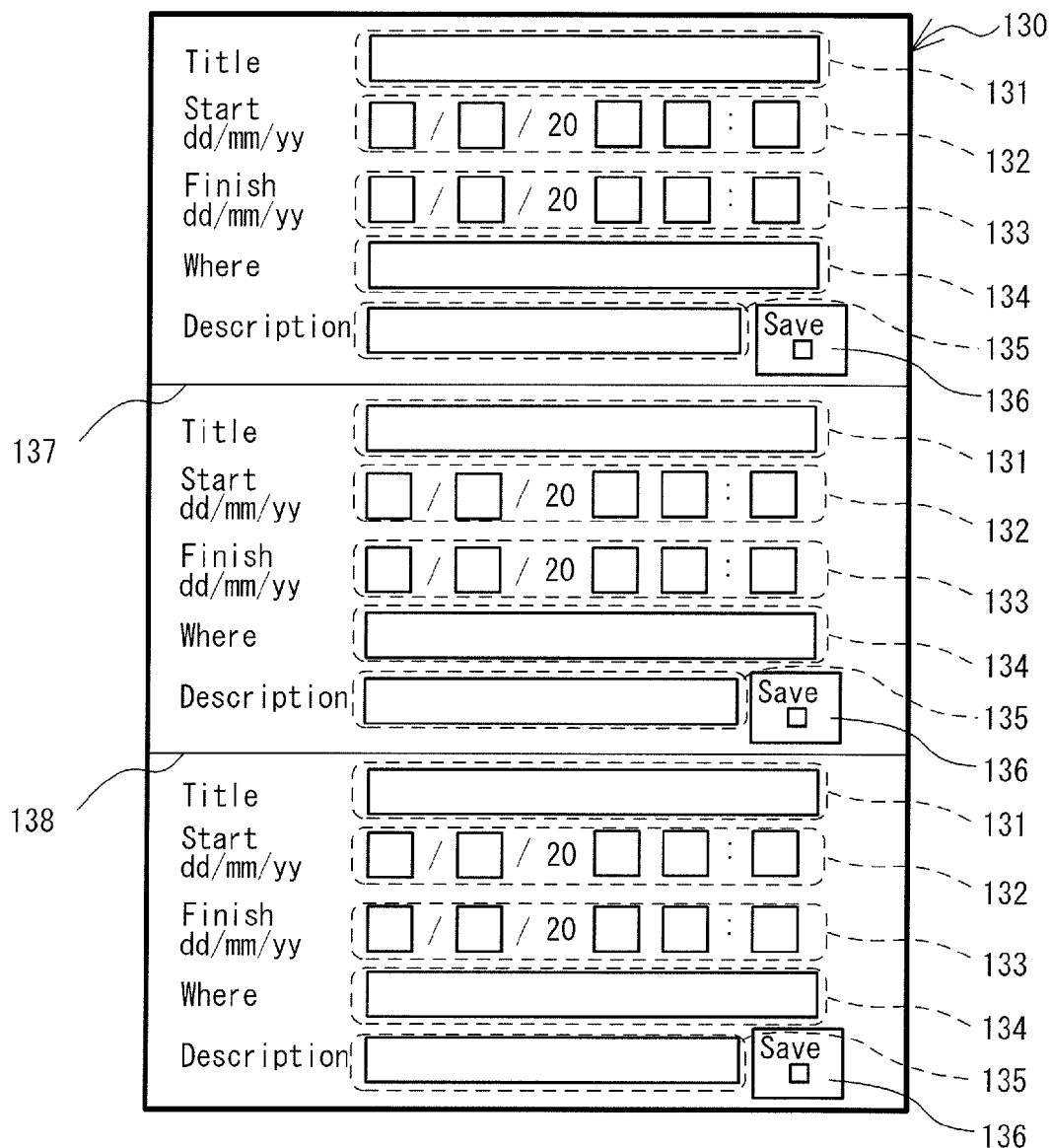
FIG. 5 is a diagram illustrating a form.

A specific example of the forms 111 (forms 120, 130) will be explained next with reference to FIGS. 4 and 5. FIGS. 4 and 5 each illustrate a one-page form 111. Accordingly, two forms 111 are disposed side by side in a transverse direction, with the paper medium 100 disposed spread open on the left reading device 26 and the right reading device 27 of the reading device 2.

The form 120 will be explained with reference to FIG. 4. A title area 121, a tag area 122, and a note area 123 are juxtaposed, in the longitudinal direction, on the form 120. A save check box 124 is printed on the bottom right of the note area 123. The note area 123 is an area for the user to freely write a line drawing using the electronic pen 3. The title area 121 is an area for the user to write a title of the line drawing that is written in the note area 123. The tag area 122 is an area for the user to write, as a tag, a keyword for searching a line drawing that is written on the note area 123. The save check box 124 is an area that is to be checked with a check mark to validate the content that is written in the title area 121, the tag area 122 and the note area 123.

The CPU 21 of the reading device 2 can identify (details are explained further on) the format of the paper medium 100 in which the forms 120 are bound. The CPU 21 acquires, for each area, stroke data of the line drawings that are written in the title area 121, the tag area 122, and the note area 123, and stores the stroke data in the flash ROM 23. The CPU 41 of the PC 19 acquires the stroke data from the reading device 2, and stores the stroke data in the RAM 43. The CPU 41 creates an image file by digitizing the line drawing on the basis of the stroke data of the line drawing that is written in the note area 123, from among the stroke data that is stored in the RAM 43. The image file is a data file in which the line drawing is represented by a digital image. Examples of digital images include, for instance, vector images and raster images. Examples of image files include, for instance, JPEG files, GIF files, PNG files, BMP files, and the like.

The CPU 41 identifies a character string by the OCR processing, on the basis of the stroke data of the line drawing that is written in the title area 121, from among the stroke data stored in the RAM 43. The CPU 41 sets the identified character string as a file name of the created image file, and stores the image file in a folder designated beforehand by the user. The CPU 41 identifies a character string by the OCR processing, on the basis of the stroke data of the line drawing that is written in the tag area 122, from among the stroke data stored in the RAM 43. The CPU 41 associates the identified character string, as a tag, with the image file. The tag associated with the image file may be used as a keyword in searches of image files.

The form 130 will be explained with reference to FIG. 5. Two horizontal lines 137, 138 are printed on the form 130 and divide the form 130 into three equal parts in the longitudinal direction. A title area 131, a start time area 132, a finish time area 133, a location area 134, and a detail area 135 are disposed, side by side in the longitudinal direction, in each of the areas that are trisected by the horizontal lines 137, 138. A save check box 136 is printed on the right of the detail area 135. The detail area 135 is an area for the user to write details of a schedule, using the electronic pen 3. The title area 131 is an area for the user to write the title of the schedule that is written in the detail area 135. The start time area 132, the finish time area 133, and the location area 134 are areas for the user to write the start time, finish time, and venue, respectively, of the schedule that is written in the detail area 135. The save check box 136 is an area that is to be checked with a check mark to validate the contents that are written in the title area 131, the start time area 132, the finish time area 133, the location area 134, and the detail area 135.

The CPU 21 of the reading device 2 can identify (details are explained further on) the format of the paper medium 100 in which the forms 130 are bound. The CPU 21 acquires, and stores in the flash ROM 23, stroke data of the respective line drawings that are written in the title area 131, the start time area 132, the finish time area 133, the location area 134, and the detail area 135. The CPU 41 of the PC 19 acquires the stroke data from the reading device 2, and stores the data in the RAM 43. The CPU 41 identifies a character string by the OCR processing, on the basis of the stroke data stored in the RAM 43. The CPU 41 associates the start time, the finish time, the venue, and the schedule details, which have been identified on the basis of the stroke data of the respective line drawings that are written in the start time area 132, the finish time area 133, the location area 134, with one another, and the detail area 135, and creates a schedule file. The CPU 41 sets the title identified on the basis of the stroke data of the line drawing written in the title area 131 as the file name of the schedule file, and stores the schedule file in a folder designated beforehand by the user. The schedule file may be used, for instance, in an application for schedule management.

Figure 6:
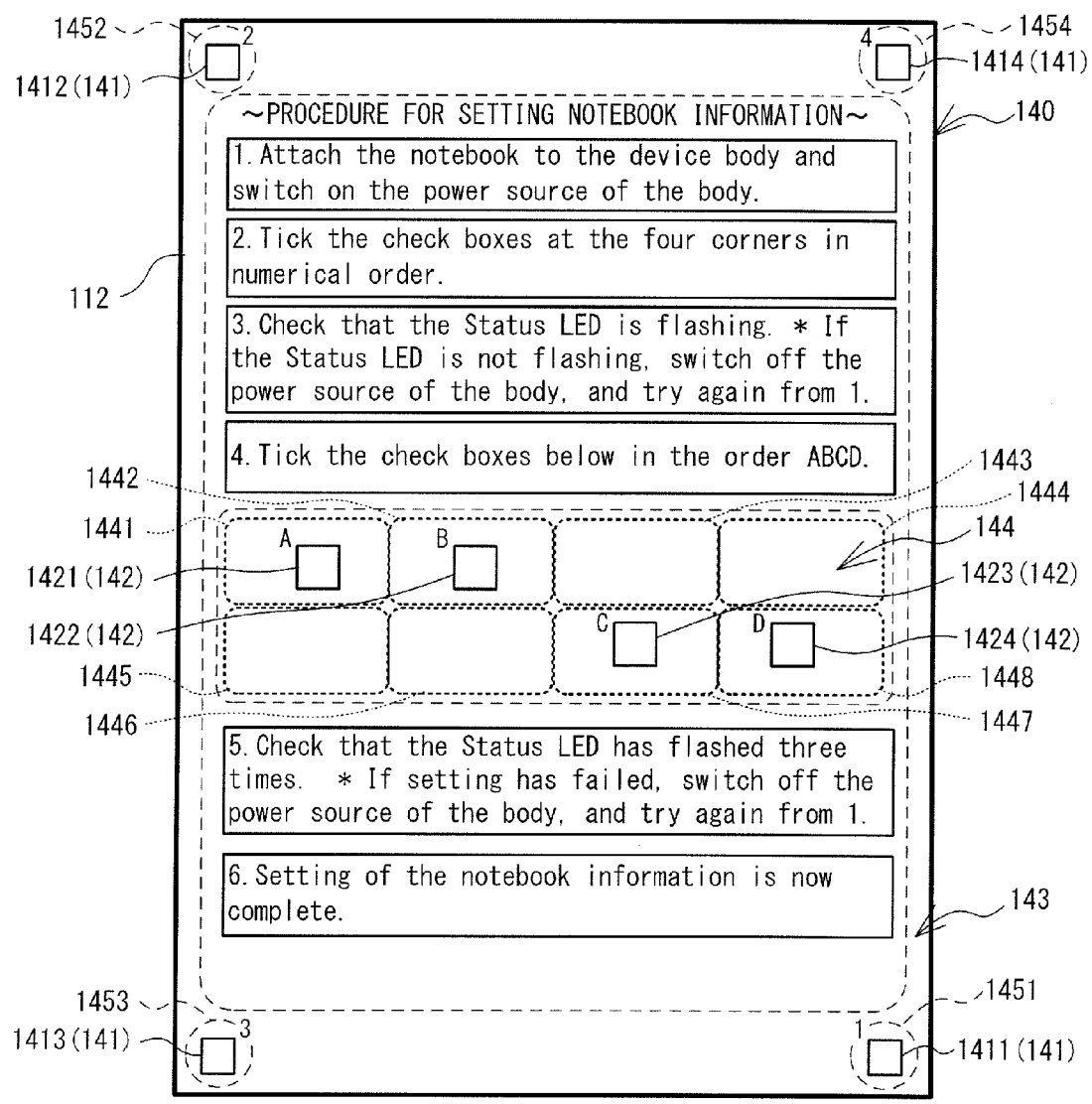
FIG. 6 is a diagram illustrating a back face of a front cover.

An explanation follows next, with reference to FIG. 6, on a specific example of a design that is printed on the back face 140 of the front cover 112 of the paper medium 100 in which the forms 120 are bound. The CPU 21 of the reading device 2 can identify the format of the paper medium 100 in which the forms 120 are bound on the basis of stroke data in a case where the back face 140 is written upon using the electronic pen 3. The CPU 21 can identify the format of the paper medium 100 in which the forms 120 are bound, and, as a result, store the stroke data of the line drawing written on the form 120 in the flash ROM 23, for each area (the title area 121, the tag area 122, and the note area 123).

As illustrated in FIG. 6, the design that is printed on the back face 140 includes four first check boxes 141 (1411, 1412, 1413, 1414) and four second check boxes 142 (1421, 1422, 1423, 1424). The four first check boxes 141 are each disposed at any position within a rim portion 143 (hereafter referred to as a "first portion") of the back face 140. Specifically, the first check boxes 1411, 1412, 1413, 1414 are respectively disposed at the bottom right, top left, bottom left, and top right within the first portion 143. The numbers "1", "2, "3" and "4" are associated to the first check boxes 1411, 1412, 1413, 1414, respectively. These numbers indicate the sequence of the four first check boxes 141.

The four second check boxes 142 are each disposed at any position within a rectangular portion (hereafter referred to as a "second portion") 144 at substantially the center, in the top-bottom direction, in an area inside of the first portion 143. Details are as follows. Eight detection areas 1441 to 1448 are formed by dividing the second portion 144 in two in the top-bottom direction, and in four in the left-right direction. The four detection areas juxtaposed in the left-right direction at the upper side of the second portion 144 are, sequentially from the left, detection areas 1441, 1442, 1443, 1444. The four detection areas juxtaposed in the left-right direction at the lower side of the second portion 144 are, sequentially from the left, detection areas 1445, 1446, 1447, 1448. For instance, as shown in FIG. 6, the second check boxes 1421, 1422, 1423, 1424 are respectively disposed in the detection areas 1441, 1442, 1447, 1448. Letters "A", "B", "C" and "D" are respectively associated to the second check boxes 1421, 1422, 1423, 1424. The letters indicate the sequence of the respective four second check boxes 142.

The positions of the four first check boxes 141 and the respective associated numbers, in the design that is printed on the back face 140, are shared positions, regardless of the bound forms 111. Therefore, the positions of the respective four first check boxes 141 and the associated numbers that are printed on the back face 140 coincide between the paper medium 100 in which the forms 120 (see FIG. 4) are bound and the paper medium 100 in which the forms 130 (see FIG. 5) are bound. By contrast, the respective positions and the associated letters of the four second check boxes 142 vary depending on the bound forms. Therefore, the respective positions and the associated letters of the four second check boxes 142 that are printed on the back face 140 differ between the paper medium 100 in which the forms 120 are bound and the paper medium 100 in which the forms 130 are bound. For instance, although not shown in the drawings, the second check boxes 1421, 1422, 1423, 1424 are respectively disposed in the detection areas 1441, 1446, 1443, 1448 on the back face 140 of the front cover 112 of the paper medium 100 in which the forms 130 are bound. Thus, the four second check boxes 142 each are disposed in any one respective detection area 1441 to 1448.

Character strings (instructions) that indicate a procedure for recognizing the format of the paper medium 100 in the reading device 2 are printed above and below the second portion 143 in the back face 140. Specifically, above the second portion 144 there are printed the character strings "1. Attach the notebook to the device body and switch on the power source of the body", "2. Tick the check boxes at the four corners in numerical order"; "3. Check that the Status LED is flashing. *If the Status LED is not flashing, switch off the power source of the body, and try again from 1."; and "4. Tick the check boxes below in the order ABCD". Below the second portion 142 there are printed the character strings "5. Check that the Status LED has flashed three times. *If setting has failed, switch off the power source of the body, and try again from 1."; and "6. Setting of the notebook information is now complete".

An explanation follows next on a procedure for the user to prompt the reading device 2 to recognize the format of the paper medium 100 in which the forms 120 are bound. Firstly, the user may place the paper medium 100 on the reading device 2 and switch on the power source of the reading device 2, according to the first instruction that is printed on the back face 140. The LEDs 5 may emit green light. The user may place the front cover 112 of the paper medium 100 on the bag 7 of the cover 4, without inserting the front cover 112 in the bag 7. Next, the user may place all the forms 111 of the paper medium 100 on the right reading device 27. As a result, only the front cover 112 may be placed on the left reading device 26, such that the back face 140 can be written upon using the electronic pen 3.

In accordance with the second instruction, next, the user may write a check mark on the first check boxes 1411 to 1414, using the electronic pen 3, according to the sequence of numbers associated to the respective four first check boxes 141. The procedures indicated by the first and the second instructions correspond to a first-stage procedure. If the procedure of the first stage is properly performed, the LEDs 5 flash in slow cycles. The user may check, according to the third instruction, that the LEDs 5 are flashing. If the procedure of the first stage is not performed properly, the LEDs 5 do not flash. In this case, the user may repeat the procedure from the first instruction.

In a case where the procedure of the first stage has been properly performed, the user may write next, using the electronic pen 3, a check mark in each of the second check boxes 1421 to 1424, in the sequence of letters associated to the respective four second check boxes 142, according to the fourth instruction. The procedure indicated by the third and fourth instructions corresponds to a second-stage procedure. If the procedure of the second stage has been properly performed, the LEDs 5 flash three times in fast cycles (for a short period). According to the fifth instruction, the user may check that the LEDs 5 have flashed three times in fast cycles. In a case where the LEDs 5 flash three times in fast cycles, this means that the reading device 2 has been able to identify the format of the paper medium 100. The user may begin thereupon an ordinary writing operation on the form 120. If the procedure of the second stage is not properly performed, the LEDs 5 emit light that is changed to red. In this case, the user may temporarily switch off the power source of the reading device 2. Next, the user may switch on the power source one more, and repeat the procedure from the first instruction.

The table 231 stored in the flash ROM 23 will be explained next with reference to FIG. 7. The table 231 is referred to when the CPU 21 is to identify the format of the paper medium 100. In the table 231 there are sequentially stored respective area information items on the four first check boxes 141. The respective area information items on the four first check boxes 141 each indicate a detection area within a circle, of a specified radius, centered on a position at which each of the four first check boxes 141 is printed. As examples of area information there is stored, for instance, "bottom right" (n=1), "top left" (n=2), "bottom left" (n=3) and "top right" (n=4), for all forms 111. The variable n indicates a number associated to each of the first check boxes 141, i.e. indicates a sequence of the four first check boxes 141. The area information items "bottom right", "top left", "bottom left" and "top right" respectively indicate the detection areas 1451, 1452, 1453, 1454, (see FIG. 6). The detection areas 1451, 1452, 1453, 1454 are indicated by circles centered on positions at which the respective first check boxes 1411, 1412, 1413, 1414 (see FIG. 6) are printed.

The table 231 stores therein, for each form 111, information that indicates any of the detection areas 1441 to 1448 of the second portion 144 at which the four second check boxes 142 are printed. As area information corresponding to the form 120 there is stored, for instance, "1441" (n=A), "1442" (n=B), "1447" (n=C), and "1448" (n=D). The variable n indicates a letter associated to each of the second check boxes 142, i.e. the sequence of four second check boxes 142. The area information items "1441", "1442", "1447", and "1448" respectively indicate detection areas in the second portion 144 (see FIG. 6) at which second check boxes 1421, 1422, 1423, 1424 are disposed. The same applies to the form 130.

Further, format information that indicates the format of the design that is printed beforehand on the forms 111, is stored in the flash ROM 23 for each form 111. As format information corresponding to the form 120, the flash ROM 23 stores format information that allows identifying the positions of the title area 121 (see FIG. 4), the tag area 122 (see FIG. 4), the note area 123 (see FIG. 4), and the save check box 124 (see FIG. 4), for instance. As format information corresponding to the form 130, the flash ROM 23 stores format information that allows identifying the positions of the title area 131 (see FIG. 5), the start time area 132 (see FIG. 5), the finish time area 133 (see FIG. 5), the location area 134 (see FIG. 5), the detail area 135 (see FIG. 5), and the save check box 136 (see FIG. 5).

Figure 8:
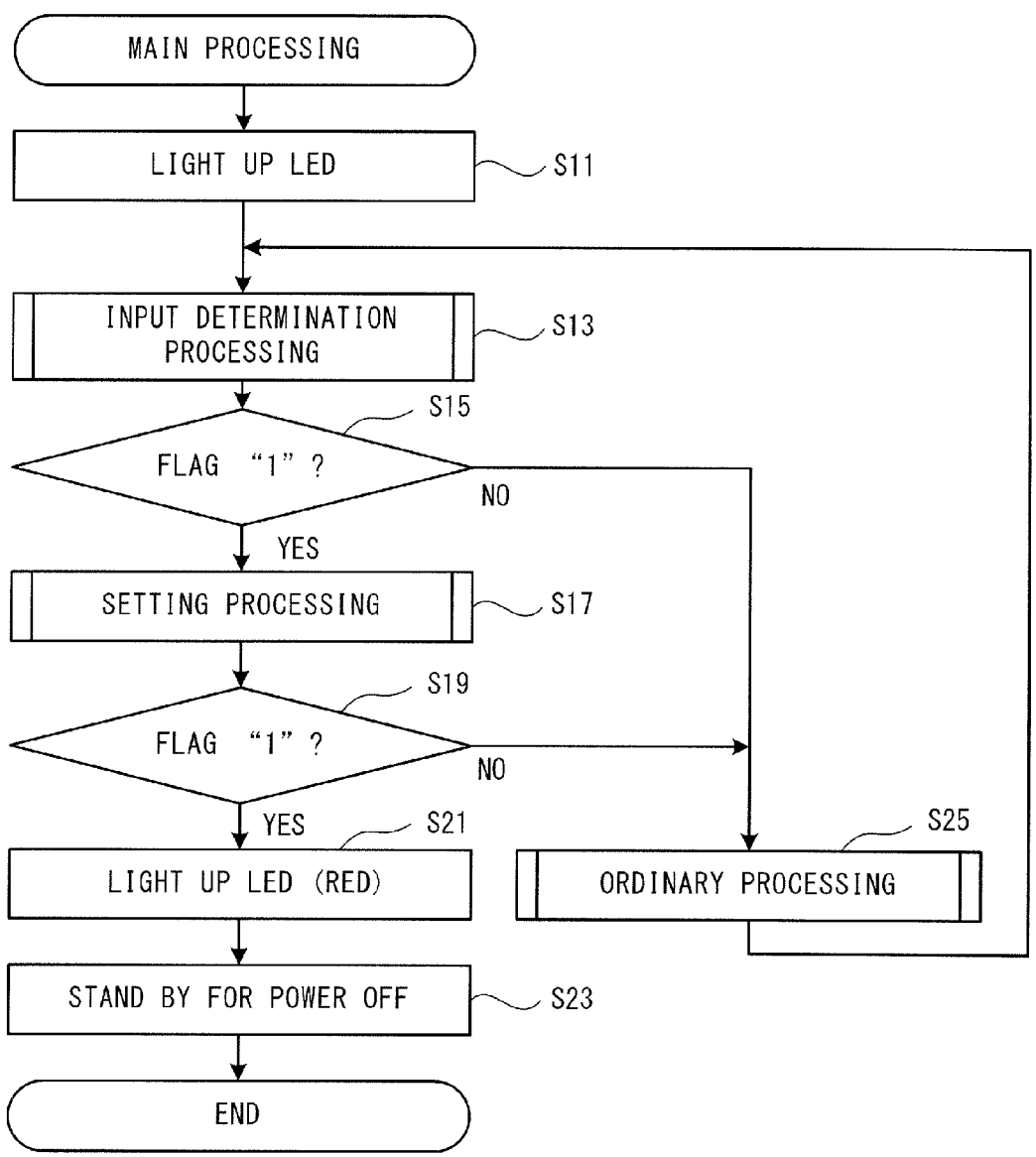
FIG. 8 is a flowchart of main processing.

A main processing executed by CPU 21 of the reading device 2 will be explained next with reference to FIGS. 8 to 11. When the power source of the reading device 2 is switched on, the CPU 21 starts main processing by operating on the basis of a program that is stored in the flash ROM 23. Firstly, as shown in FIG. 8, the CPU 21 causes the LEDs 5 to light up in green, in order to notify, to the user, that the reading device 2 is operating (step S11). The CPU 21 executes processing of performing a first-stage determination (input determination processing, see FIG. 9) (step S13).

Figure 9:
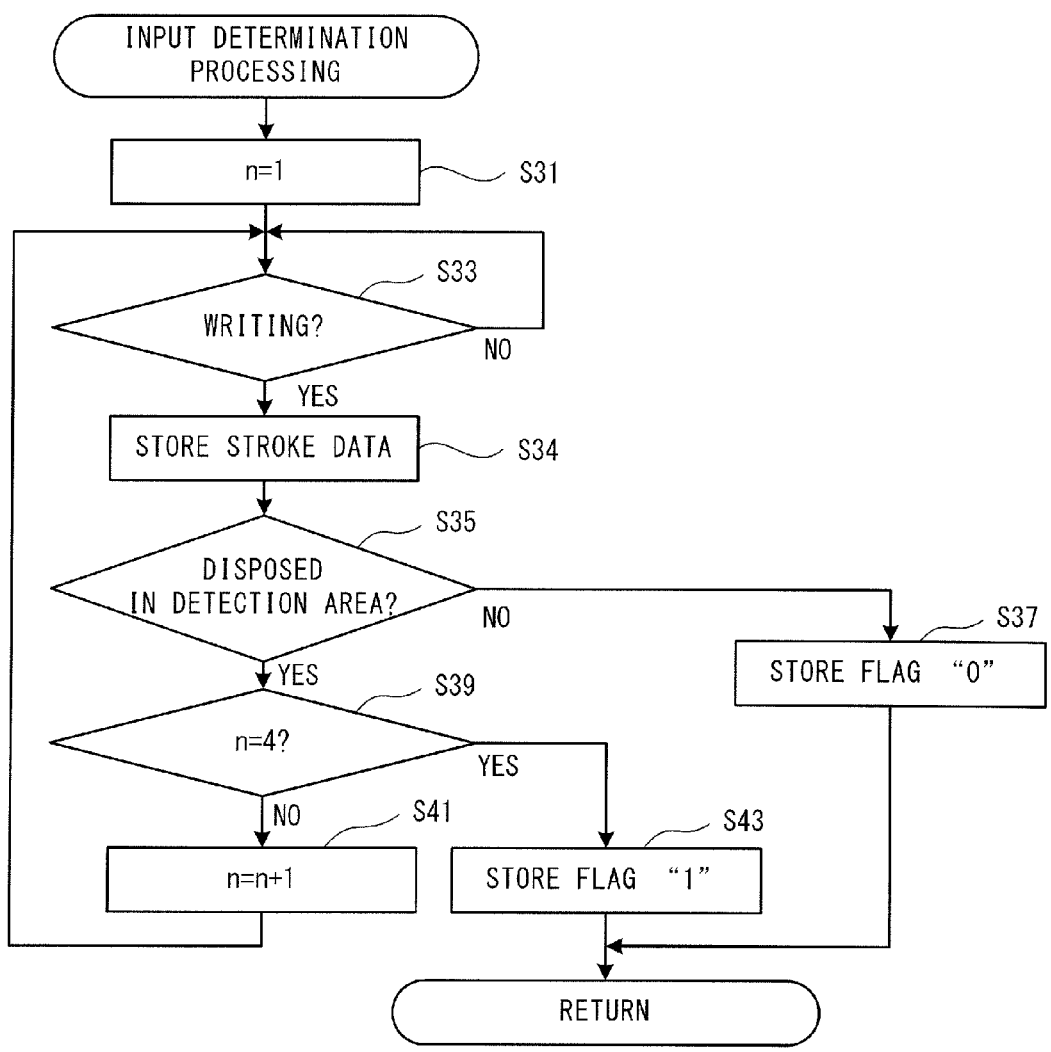
FIG. 9 is a flowchart of input determination processing.

The input determination processing will be explained next with reference to FIG. 9. The CPU 21 performs initialization by substituting 1 in the variable n, and storing the result in the RAM 22 (step S31). The CPU 21 determines whether a line drawing is written by the electronic pen 3 at any location (step S33). If the CPU 21 determines that no line drawing is written (NO at step S33), the processing is returned to step S33. If the CPU 21 determines that a line drawing is written at any location (YES at step S33), the CPU 21 acquires stroke data from the ASIC 281, and stores the stroke data in the flash ROM 23 (step S34). The CPU 21 refers to the table 231 (see FIG. 7), and selects area information corresponding to the variable n, from the area information that indicates four detection areas associated to the first check boxes 141. The CPU 21 determines whether a position identified on the basis of the coordinate information included in the stroke data that is stored in the flash ROM 23 at step S34 is disposed in the detection area indicated by the selected area information (step S35). Hereafter, a position identified on the basis of coordinate information included in the stroke data is referred to as "identified coordinate position".

If the CPU 21 determines that the identified coordinate position is disposed in the detection area indicated by the selected area information (YES at step S35), the CPU 21 determines whether the variable n is 4 (step S39). If the CPU 21 determines that the variable n is not 4 (NO at step S39), the CPU 21 adds 1 to the variable n (step S41). The CPU 21 returns the processing to step S33, and repeats the processing from step S33 onwards on the basis of the updated variable n.

When the variable n reaches 4, this means that writing has been performed, in the order of the corresponding numbers, on the respective first check boxes 1411 to 1414. If the CPU 21 determines that the variable n is 4 (YES at step S39), the CPU 21 stores flag information "1" in the RAM 22 (step S43) in order to execute the setting processing (step S17) in the main processing (see FIG. 8). The CPU 21 terminates the input determination processing, and returns the processing to the main processing (see FIG. 8).

By contrast, if the identified coordinate position is not disposed in a detection area indicated by the selected area information, this means that no writing has been performed in the order of corresponding numbers, on any of the first check boxes 1411 to 1414. If the CPU 21 determines that the identified coordinate position is not disposed in the area indicated by the selected area information (NO at step S35), the CPU 21 stores flag information "0" in the RAM 22 (step S37) in order to execute ordinary processing (step S25) in the main processing (see FIG. 8). The CPU 21 terminates the input determination processing, and returns the processing to the main processing (see FIG. 8).

For instance, the user may perform the ordinary writing operation in a state where the form 111 is placed on the left reading device 26 after the power source of the reading device 2 has been switched on. In this case, writing may not be performed in the first check boxes 1411 to 1414 in the order of corresponding numbers, and hence the ordinary processing may be performed.

After the input determination processing (step S13) is over, the CPU 21 determines whether to perform the setting processing (step S17) or the ordinary processing (step S25) on the basis of the flag information stored in the RAM 22, as shown in FIG. 8 (step S15). If the CPU 21 determines that the flag information "1" is stored in the RAM 22 (YES at step S15), the CPU 21 determines to execute the setting processing (step S17) of performing a second-stage determination. If, by contrast, the CPU 21 determines that the flag information "0" is stored in the RAM 22 (NO at step S15), the CPU 21 determines to execute the ordinary processing (step S25) of receiving an ordinary writing operation.

Figure 10:
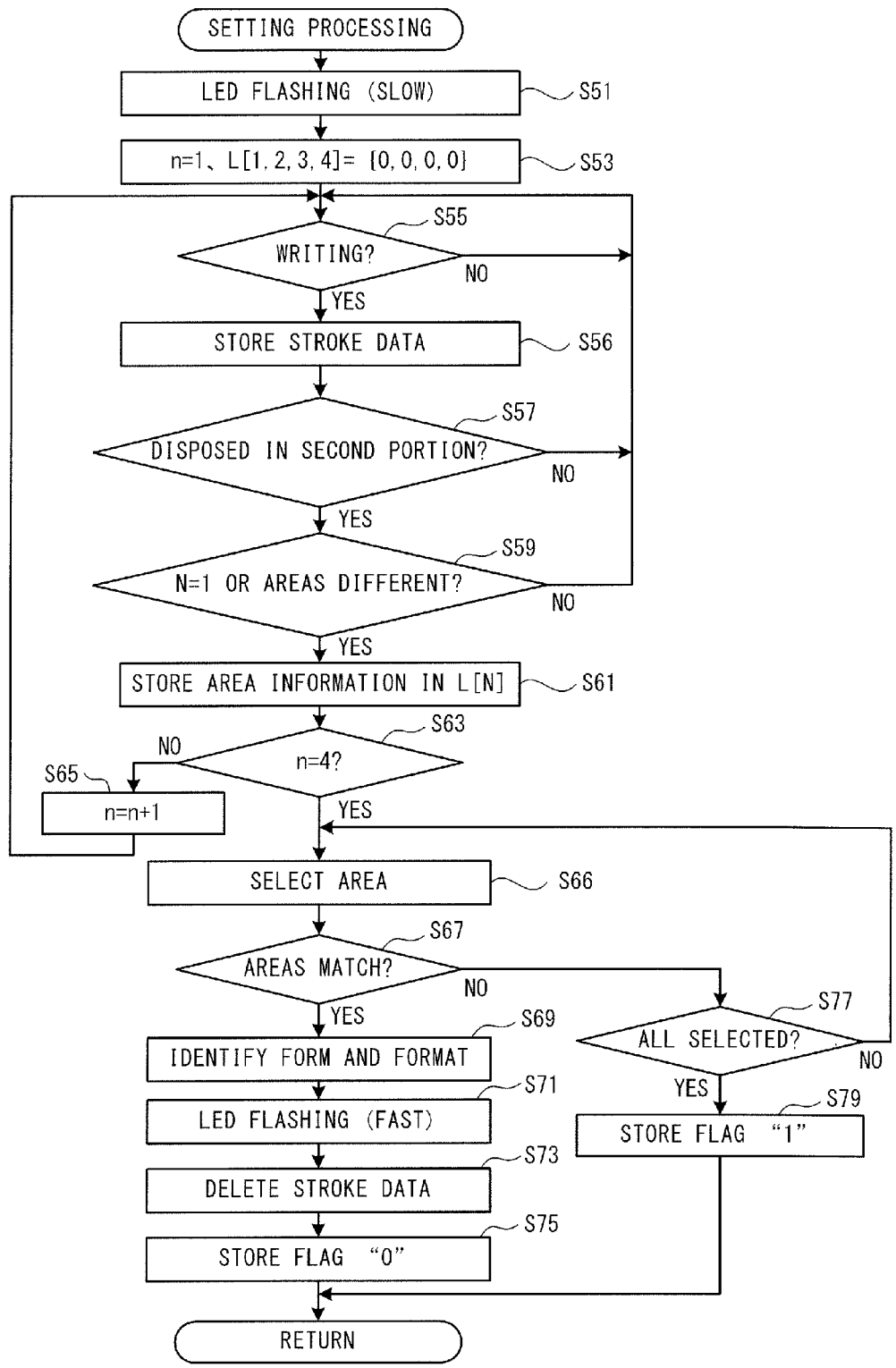
FIG. 10 is a flowchart of setting processing.

The setting processing is explained next with reference to FIG. 10. The CPU 21 causes the LEDs 5 to flash in slow cycles, in order to notify the user that the determination of the first stage by the input determination processing (see FIG. 9) has been completed normally (step S51). The CPU 21 substitutes 1 in the variable n, and stores the result in the RAM 22 (step S53). The CPU 21 substitutes 0 in each of the arrays L[1], L[2], L[3], and L[4], and stores the result in the RAM 22 (step S53). The CPU 21 determines whether a line drawing is written by the electronic pen 3 at any location (step S55). If the CPU 21 determines that no line drawing is written (NO at step S55), the process is returned to S55.

If the CPU 21 determines that a line drawing is written at any location (YES at step S55), the CPU 21 acquires stroke data from the ASIC 281, and stores the stroke data in the flash ROM 23 (step S56). The CPU 21 determines whether the identified coordinate position of stroke data stored in the flash ROM 23 is disposed within the second portion 144 (see FIG. 6) (step S57). If the CPU 21 determines that the identified coordinate position is not disposed within the second portion 144 (NO at step S57), the CPU 21 returns the processing to step S55.

If the CPU 21 determines that the identified coordinate position is disposed within the second portion 144 (YES at step S57), the CPU 21 identifies a detection area at which the identified coordinate position is disposed, from among the eight detection areas 1441 to 1448 in the second portion 144 (see FIG. 6). The CPU 21 determines whether the variable n is 1 and/or whether the area information that indicates the identified detection area and the area information stored in the array L[n−1] are different from each other (step S59). If the variable n is equal to or greater than 2, and the area information items match each other, this means that writing has been performed consecutively two or more times in any one detection area from among the eight detection areas 1441 to 1448. If the CPU 21 determines that the variable n is equal to or greater than 2 and the area information items match each other (NO at step S59), the CPU 21 returns the processing to step S55.

In a case where, for instance, the electronic pen 3 comes into contact with a specific detection area over two or more consecutive times, the CPU 21 determines that the variable n is equal to or greater than 2 and the area information items match each other (NO at step S59), and returns the processing to step S55.

On the other hand, in a case where the variable n is 1 or the area information items are different from each other, this means that writing has been performed once at each of the dissimilar detection areas of the eight detection areas 1441 to 1448 (see FIG. 6). If the CPU 21 determines that the variable n is 1 or that area information items are different from each other (YES at step S59), the CPU 21 substitutes, in the array L[n], area information that indicates the detection areas that include the identified coordinate position, and stores the result (step S61). The CPU 21 determines whether the variable n is 4 (step S63). If the CPU 21 determines that the variable n is smaller than 4 (NO at step S63), the CPU 21 adds 1 to the variable n (step S65). The CPU 21 then returns the processing to step S55. The CPU 21 repeats the processing from steps S55 to S63 on the basis of the updated variable n.

In a case where the variable n is now 4, this means that writing has been performed in each of four dissimilar areas from among the eight detection areas 1441 to 1448. Respective area information items (any from among 1441 to 1448) are stored in the respective arrays L[1] to L[4]. If the CPU 21 determines that the variable n is 4 (YES at step S63), the CPU 21 selects, from the table 231, area information that indicates four detection areas associated to the second check boxes 142, for one form 111 (step S66). The CPU 21 compares the selected area information that indicates the four detection areas with area information stored in the arrays L[1] to L[4], for each corresponding variable n (step S67). If the CPU 21 determines that both area information items that indicate the four detection areas match wholly each other (YES at step S67), the CPU 21 identifies a form 111 corresponding to the area information that indicates the four detection areas that has been selected at step S66, as the form 111 placed on the reading device 2 (step S69). The CPU 21 reads, from the table 231, the format information corresponding to the identified form 111 and stores the format information in the RAM 22, as the format of the paper medium 100 in which the forms 111 are bound (step S69).

The CPU 21 causes the LEDs 5 to flash three times in fast cycles, in order to notify the user that the format of the paper medium 100 has been identified, and that the determination of the second stage has been completed (step S71). CPU 21 deletes the stroke data stored in the flash ROM 23 at step S34 (see FIG. 9) and step S56 (step S73). The CPU 21 stores flag information "0" in the RAM 22 (step S75) in order to execute the ordinary processing in the main processing (FIG. 8). The CPU 21 terminates the setting processing, and returns the processing to the main processing (see FIG. 8).

On the other hand, if the CPU 21 determines that the area information indicating any detection area from among the area information items that indicate four detection areas that has been selected for one of the forms 111 at step S66 is different from any of the area information items stored in the arrays L[1] to L[4] (NO at step S67), the CPU 21 determines whether the area information items corresponding to all the forms 111 have been selected, at step S66, from the table 231 (step S77). If the CPU 21 determines that the area information corresponding to a form 111 that has not been selected at step S66 remains in the table 231 (NO at step S77), the CPU 21 returns the processing to step S66. The CPU 21 selects the area information that indicates the four detection areas corresponding to the form 111 that has not been selected (step S66), and repeats the processing. If the CPU 21 determines that the area information corresponding to the all forms 111 has been selected, at step S66, from the table 231 (YES at step S77), the CPU 21 stores flag information "1" in the RAM 22 (step S79) in order to terminate the main processing (see FIG. 8). The CPU 21 terminates the setting processing, and returns the processing to the main processing (see FIG. 8).

After termination of the setting processing (step S17), the CPU 21 determines whether to terminate the main processing or to perform the ordinary processing (step S25), on the basis of the flag information stored in the RAM 22, as shown in FIG. 8 (step S19). If the CPU 21 determines that the flag information "1" is stored in the RAM 22 (YES at step S19), the CPU 21 causes the LEDs 5 to change color and light up in red, in order to notify the user that identification of the format of the paper medium 100 has failed (step S21). The CPU 21 stands by until the power source of the reading device 2 is switched off (step S23). The CPU 21 terminates the main processing when the power source of the reading device 2 is switched off.

Figure 11:
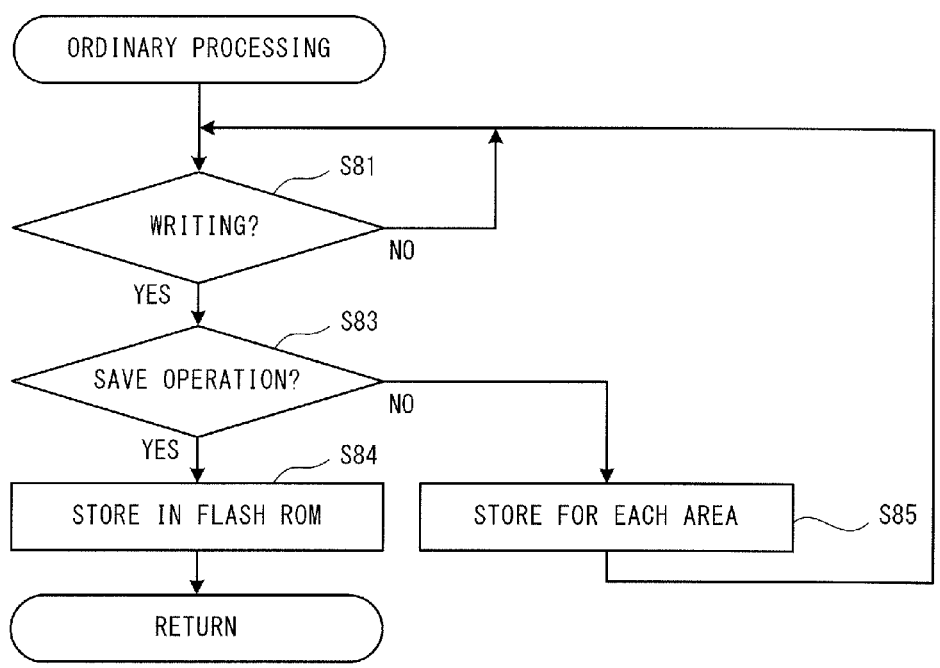
FIG. 11 is a flowchart of ordinary processing.

The ordinary processing is explained next with reference to FIG. 11. Firstly, the CPU 21 determines whether format information is stored in the RAM 22. If no format information is stored in the RAM 22, the CPU 21 stores default format information (for instance, format data corresponding to the form 120) in the RAM 22.

For instance, the ordinary processing is performed on the basis of the default format information in a case where the user starts an ordinary writing operation on the form 111 that is placed on the left reading device 26 after the power source of the reading device 2 has been switched on (NO at step S15, FIG. 8). In a case where the format of the paper medium 100 is identified as a result of the setting processing, the ordinary processing is performed on the basis of the format information that has been stored in the RAM 22 in S69 (see FIG. 10).

The CPU 21 determines whether a line drawing is written by the electronic pen 3 at any location (step S81). If the CPU 21 determines that no line drawing is written (NO at step S81), the processing is returned to step S81. If the CPU 21 determines that a line drawing is written at any location (YES at step S81), the CPU 21 acquires stroke data from the ASIC 281. The CPU 21 determines whether a line drawing is written on the save check box (one of the save check box 124 (see FIG. 4) and the save check boxes 136 (see FIG. 5)), on the basis of the format information stored, at step S69 (see FIG. 10), in the RAM 22 (step S83). If the CPU 21 determines that no line drawing is written in the save check box (NO at step S83), the CPU 21 identifies an area at which a line drawing according to stroke data is written, on the basis of the format information stored in the RAM 22. The CPU 21 associates the information that indicates the identified area to the acquired stroke data, and stores the result in the RAM 22 (step S85). The CPU 21 returns the processing to step S81.

In a case where, for instance, the format information corresponding to the form 120 is stored in the RAM 22, the CPU 21 identifies whether the acquired stroke data is written on any one of the title area 121, the tag area, and the detail area 135. The CPU 21 associates information indicating the written area (any one from among the title area 121, the tag area, and the note area 123) to the stroke data, and stores the result in the RAM 22. In a case where, for instance, the format information corresponding to the form 130 is stored in the RAM 22, the CPU 21 identifies whether the acquired stroke data is written on any one of the title area 131, the start time area 132, the finish time area 133, the location area 134, and the detail area 135. The CPU 21 associates the information indicating the written area (any one from among the title area 131, the start time area 132, the finish time area 133, the location area 134, and the detail area 135) to the stroke data, and stores the result in the RAM 22.

On the other hand, if the CPU 21 determines that a line drawing is written in the save check box (YES at step S83), the CPU 21 stores, in the flash ROM 23, the stroke data that is stored in the RAM 22 and that is associated with area information (step S84). As a result, a state is brought about in which the stroke data can be transmitted from the reading device 2 to the PC 19. The CPU 21 terminates the ordinary processing, and returns the processing to the main processing (see FIG. 8). After termination of the ordinary processing (step S25), the CPU 21 returns the processing to step S13, as shown in FIG. 8. The CPU 21 executes the processing of performing the first-stage determination (input determination processing, FIG. 9).

As explained above, the CPU 21 of the reading device 2 firstly determines, in the input determination processing (see FIG. 9), whether a writing operation on the four first check boxes 141 is performed according to area information that indicates four detection areas corresponding to the first check boxes in the table 231 (step S35). If the CPU 21 determines that the writing operation is performed in accordance with the area information that indicates four detection areas corresponding to the first check boxes in the table 231, the CPU 21 determines, in the setting processing (see FIG. 10), whether a writing operation on the four second check boxes 142 is performed according to any one of area information items that indicate four detection areas corresponding to the second check boxes in the table 231 (step S67). The CPU 21 identifies, as format information corresponding to the paper medium 100, the format information that is associated to the area information corresponding to the writing operation (step S69). Thus, the CPU 21 determines a writing operation and identifies the format of the paper medium 100, over two stages, namely the input determination processing and the setting processing. Therefore, it becomes possible to prevent erroneous determination of a writing operation for identifying the format of the paper medium 100, in a case where an ordinary writing operation has been performed. Accordingly, it becomes possible to prevent the CPU 21 from erroneously identifying a format that is different from the format of the paper medium 100 that is placed on the left reading device 26 and the right reading device 27 of the reading device 2.

The CPU 21 stores, in the flash ROM 23, stroke data that includes information on a plurality of coordinates detected by the sensor boards 8, 9 (steps S34, S56); as a result, it becomes possible to digitize, and to store, information on line drawings based on a writing operation. If the format of the paper medium 100 has been identified in the setting processing (step S69), the CPU 21 deletes the stroke data that is stored in the flash ROM 23 (step S73). As a result, the CPU 21 can exclude, from information of line drawings based on writing operations, information on line drawings based on a writing operation that is performed in order to cause the reading device 2 to recognize the format of the paper medium 100. This allows the CPU 21 to store, in the flash ROM 23, only stroke data of a line drawing that accompanies an ordinary writing operation.

By contrast, if the CPU 21 determines, in the input determination processing, that a writing operation has not been performed according to the area information that indicates four detection areas corresponding to the first check boxes in the table 231, the CPU 21 executes the ordinary processing, without deleting the stroke data stored in the flash ROM 23. Therefore, it becomes possible to digitize and store line drawing information on the basis of the stroke data that is stored in the flash ROM 23, in a case where the ordinary writing operation is performed immediately after the power source is switched on. It becomes also possible to prevent the CPU 21 from deleting, from the flash ROM 23, stroke data that is acquired on the basis of the ordinary writing operation.

In the input determination processing, the CPU 21 determines a writing operation on the first check boxes 141 that are disposed at the first portion 143 corresponding to the rim portion of the back face 140 (the first stage). Next, in the setting processing, the CPU 21 determines a writing operation on the second check boxes 142 disposed at the second portion 144 inside of the first portion 143 at the back face 140 (the second stage). Thus, the CPU 21 determines, over two stages, that a writing operation has been performed at dissimilar areas. Accordingly, it becomes possible to more properly prevent the CPU 21 from erroneously determining an ordinary writing operation to be an operation for identifying the format of the paper medium 100. It becomes also possible to prevent the CPU 21 from erroneously determining, in the second stage, a writing operation that should be determined in the first stage and erroneously determining, in the first stage, a writing operation that should be determined in the second stage. Therefore, the CPU 21 can accurately identify the format of the paper medium 100 by virtue of a clear distinction between the first-stage determination and the second-stage determination.

If, in the input determination processing (see FIG. 9), the CPU 21 determines that the writing operation on the four first check boxes 141 is performed according to the table 231, the CPU 21 causes the LEDs 5 to flash in slow cycles (step S51). If, in the setting processing (see FIG. 10), the CPU 21 determines that the writing operation on the four second check boxes 142 is performed according to the table 231 and the format of the paper medium 100 has been successfully identified, the CPU 21 causes the LEDs 5 to flash in fast cycles (step S71). Therefore, the user of the reading device 2 can easily recognize, at a glance, whether the reading device 2 has identified the format of the paper medium 100.

If a check mark has been written over two or more consecutive times at any one area from among the eight detection areas 1441 to 1448 of the second portion 144, the CPU 21 identifies the format of the paper medium 100 by excluding a second and subsequent writing operations. Therefore, the CPU 21 can accurately recognize the format of the paper medium 100 even in a case where the user erroneously performs a writing operation, over a plurality of consecutive times, on a same detection area.

The CPU 21 executes the input determination processing in a case where the power source of the reading device 2 has been switched on (upon start of the main processing) and in a case where the save check box has been written upon (YES at step S83). The save check box is written upon in order to store, in the reading device 2, information on line drawings based on a writing operation. In a case where the power source of the reading device 2 has been switched on and in a case where the save check box has been written upon, there is a high likelihood that a new paper medium 100 is placed thereafter on the left reading device 26 and the right reading device 27. Accordingly, in a case where a new paper medium 100 is placed on the left reading device 26 and the right reading device 27, the CPU 21 can identify the format of the paper medium 100 that has been newly placed.

The present disclosure is not limited to the embodiments above, and can be modified in various ways. In the reading device 2, the position of the electronic pen 3 may be detected by using another method. For instance, the reading device 2 may be provided with a touch panel. The driving scheme of the touch panel is preferably of resistive type. The paper medium 100 may be placed on the touch panel. In an operation of writing of a line drawing on the form 111 of the paper medium 100 by the electronic pen 3, the CPU 21 may then detect the position at which the writing pressure is applied, via the touch panel.

The designs of the forms 120, 130 shown in FIGS. 4 and 5 and the design of the back face 140 shown in FIG. 6 are exemplary in nature. The type, number, and size of the various areas which are disposed on each of the forms 120, 130, and the back face 140 may be modified. The design shown in FIG. 6 may be printed on the back face of the back cover 113 of the paper medium 100. The user may perform a writing operation on the basis of the design that is printed on the back face of the back cover 113 so that the reading device 2 may identify the format of the paper medium 100.

In a case where the format of the paper medium 100 is identified in the setting processing (see FIG. 10), the CPU 21 deletes the stroke data that is stored in the flash ROM 23 (step S73). In another configuration, for instance, the CPU 21 may identify the format of the paper medium 100 and cause the LEDs 5 to flash in fast cycles (step S71), and stand by thereafter for an input operation by the user. Upon reception of an input operation by the user, the CPU 21 may then delete the stroke data that is stored in the flash ROM 23. By contrast, if no input operation by the user is received within a specified time, the CPU 21 may execute the ordinary processing as-is (see FIG. 11), without deleting the stroke data stored in the flash ROM 23.

The positions of the first check boxes 141 and the second check boxes 142 may be modified. For instance, the first check boxes 141 may be disposed in the second portion 144, and the second check boxes 142 may be disposed in the first portion 143. The first check boxes 141 and the second check boxes 142 may be disposed in one of the first portion 143 and the second portion 144.

Instead of issuing warnings by way of the LEDs 5, the CPU 21 may output sound from a speaker, not shown. Instead of issuing warnings by way of the LEDs 5, the CPU 21 may cause the reading device 2 to vibrate by way of a vibration motor not shown.

In a case where writing operations are performed over a plurality of consecutive times on the same area from among the eight detection areas 1441 to 1448 in the second portion, the CPU 21 may detect the writing operations as dissimilar writing operations. The CPU 21 may execute the input determination processing and the setting processing upon reception of an input operation for identifying the format of the paper medium 100.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An input apparatus comprising:
  a detection portion configured to detect a position at which a paper medium disposed in a specified area of the input apparatus is written upon by a writing portion;
  a processor; and
  a memory configured to store computer-readable instructions, wherein the computer-readable instructions cause the processor to perform processes comprising:
    acquiring a plurality of first positions, the plurality of first positions being a plurality of positions detected by the detection portion;
    performing a first determination including determining whether a combination of the plurality of first positions and a sequence of the plurality of first positions that have been acquired satisfy a first condition, the sequence of the plurality of first positions being a sequence in which the plurality of first positions have been acquired, and the first condition indicating a combination of a plurality of positions and a sequence of a plurality of positions;

acquiring a plurality of second positions, the plurality of second positions being a plurality of positions detected by the detection portion after it has been determined that the combination of the plurality of first positions and the sequence of the plurality of first positions satisfy the first condition;

performing a second determination including determining, with reference to a first storage portion, whether a combination of the plurality of second positions and a sequence of the plurality of second positions that have been acquired satisfy any of a plurality of second conditions that are stored in the first storage portion, the sequence of the plurality of second positions being a sequence in which the plurality of second positions have been acquired, the first storage portion being configured to store each of the plurality of second conditions and format information in association with each other, each of the plurality of second conditions indicating a combination of a plurality of positions and a sequence of a plurality of positions, and the format information identifying a format of the paper medium; and identifying, in response to determining that the combination of the plurality of second positions and the sequence of the plurality of second positions satisfy one of the plurality of second conditions, format information associated with the one of the plurality of second conditions.

2. The input apparatus according to claim 1, wherein the computer-readable instructions further cause the processor to perform processes comprising:

storing the plurality of first positions in a second storage portion;

storing the plurality of second positions in the second storage portion; and deleting, in response to determining that the combination of the plurality of second positions and the sequence of the plurality of second positions satisfy one of the plurality of second conditions, the plurality of first positions and the plurality of second positions that are stored in the second storage portion.

3. The input apparatus according to claim 1, wherein the first condition requires that the plurality of first positions be disposed within a first portion, the first portion being a rim portion of the specified area, and each of the plurality of second conditions requires that the plurality of second positions be disposed within a second portion, the second portion being a portion, of the specified area, inside of the first portion.

4. The input apparatus according to claim 1, wherein the computer-readable instructions further cause the processor to perform a process comprising:

issuing a notification, in response to determining that the combination of the plurality of first positions and the sequence of the plurality of first positions satisfy the first condition and determining that the combination of the plurality of second positions and the sequence of the plurality of second positions satisfy one of the plurality of second conditions.

5. The input apparatus according to claim 1, wherein the specified area includes a plurality of detection areas that are set beforehand, and the second determination includes, in a case where a first detection area and a second detection area match each other, determining, on a basis of at least some of the plurality of detection areas excluding the second detection area, whether the combination of the plurality of second positions and the sequence of the plurality of second positions satisfy any of the plurality of second conditions, the plurality of second positions being respectively included in the at least some of the plurality of detection areas, and the first detection area and the second detection area being two detection areas that respectively includes two second positions, of the plurality of second positions, that have been acquired consecutively.

6. The input apparatus according to claim 1, wherein the acquiring a plurality of first positions includes acquiring the plurality of first positions in a case where a plurality of positions are detected by the detection portion after one of: a power source of the input apparatus has been switched on; or there has been performed a writing operation for storing, in the input apparatus, information on a line drawing based on the writing operation.

7. The input apparatus according to claim 1, wherein the specified area includes a plurality of first areas and a plurality of second areas, the respective plurality of positions indicated by the first condition indicate the plurality of first areas, the respective plurality of positions indicated by each of the plurality of second conditions indicate the plurality of second areas, and a size of each of the plurality of first areas is different from a size of the plurality of second areas.

8. The input apparatus according to claim 7, wherein each of the plurality of second areas is larger than each of the plurality of first areas.

\* \* \* \* \*